INVENTOR
Eleuthere Poumakis

BY
Lane, Aitken, Dunner & Ziems
ATTORNEYS

INVENTOR
Eleuthere Poumakis
BY
Lane, Aitken, Dunner & Ziems
ATTORNEYS

United States Patent Office 3,453,612

Patented July 1, 1969

3,453,612

MAGNETIC HEAD SELECTION CIRCUITRY

Eleuthere Poumakis, Danville, Calif., assignor to Potter Instrument Company, Inc., Plainview, N.Y., a corporation of New York Filed Aug. 26, 1966, Ser. No. 575,451
Int. Cl. G11b 5/00
U.S. Cl. 340—174.1 11 Claims

ABSTRACT OF THE DISCLOSURE

A transducer selection circuitry comprising a plurality of center tapped transducers. The center taps of transducers which engage the same track are interconnected by an impedance. By properly biasing a diode and transistor which are also connected to the impedance, selection of the transducer is achieved.

This invention relates to magnetic storage of information and, more particularly, to a magnetic storage system with an improved means for selecting the magnetic transducers.

The system of the present invention employs separate transducers for recording information on magnetic tape and for playing back the recorded information. The transducers used for recording are referred to as writing transducers and the transducers used for playing back or reading out the recorded information are referred to as reading transducers. Separate reading and writing transducers are employed because this feature enables the information that is recorded by a writing transducer to be immediately read out by a reading transducer so as to provide a check to insure that the information is properly recorded. Selecting means are provided to select individual writing and reading transducers so that a single track from the magnetic tape may be selected for transducing operations. In accordance with the present invention, both the reading transducer and the writing transducer of a selected track are enabled for transducing operations by a signal applied to a single line connected in common with both the reading and writing transducer. This arrangement eliminates the need for separate selecting circuitry for the reading transducers and the writing transducers. Because the same line is used to enable both the reading and the writing transducer of a given track, circuitry is provided to attenuate the cross talk that would otherwise occur between the reading and writing transducers.

Accordingly, an object of the present invention is to provide an improved magnetic storage system.

Another object of the present invention is to provide an improved storage system employing separate reading and writing transducers for each recording track.

A further object of the present invention is to reduce the amount of selecting circuitry required in a magnetic storage system employing separate reading and writing transducers.

A still further object of the present invention is to eliminate the problem of cross talk between transducers when a single line is connected in common to a plurality of transducers to simultaneously enable the plurality of transducers for transducing operations.

Figure 1:
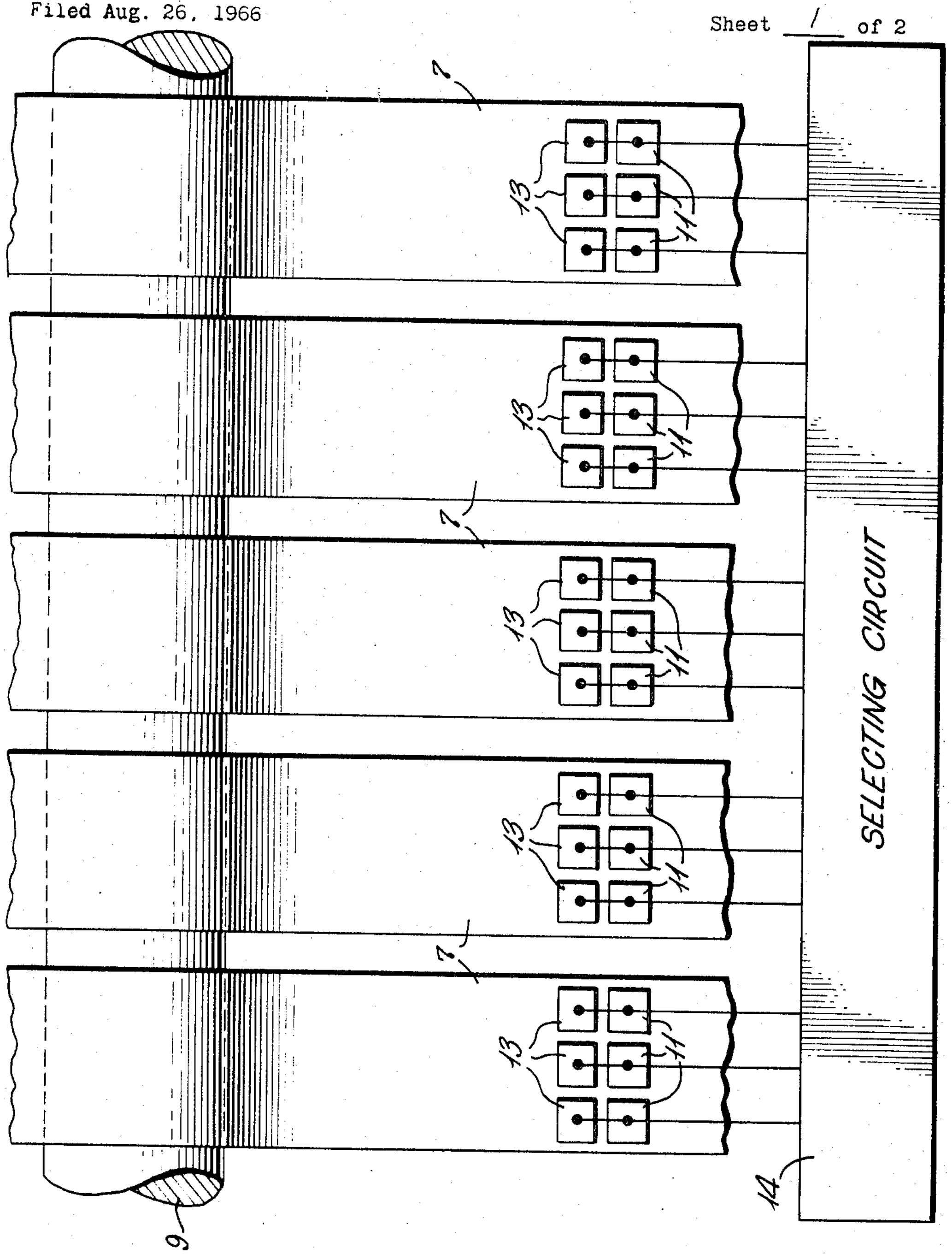
Figure 2:
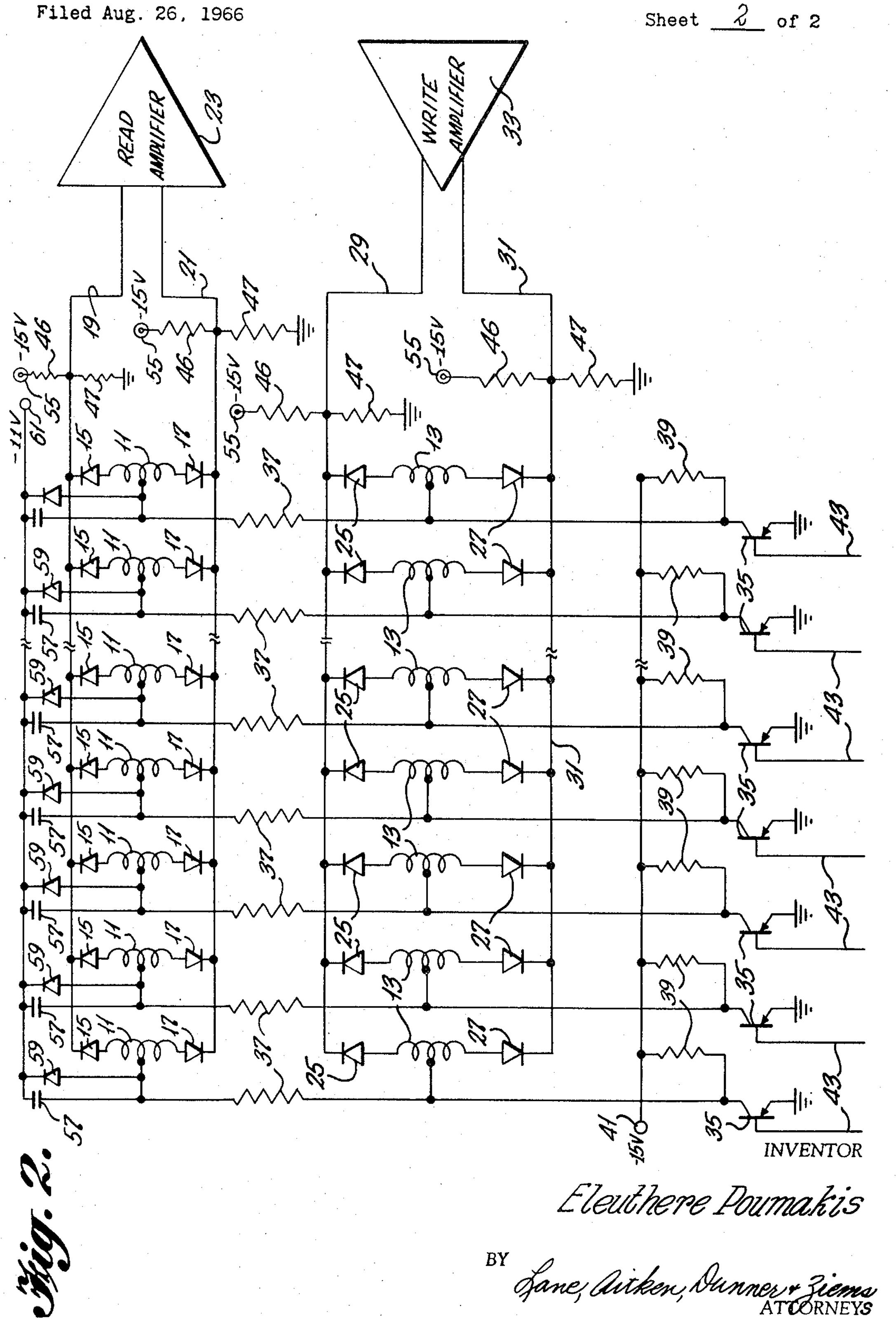

Further objects and advantages of the present invention will become readily apparent as the following detailed description of the present invention unfolds and when taken in conjunction with the drawings, wherein:

FIG. 1 schematically illustrates the magnetic storage system of the present invention; and FIG. 2 illustrates the details of the selecting circuit of the present invention.

As shown in FIG. 1, a plurality of magnetic tapes 7 are driven continuously by a capstan 9 past writing transducers 11 and reading transducers 13. Three writing transducers and three reading transducers are provided for each tape. The reading transducers are aligned with the writing transducers so as to read out from the same track in which the writing transducers record. A selecting circuit 14 is provided to select a writing transducer and a reading transducer performing transducing operations in the same track. In this manner, a single magnetic track is selected for transducing operations. The selecting circuit selects the writing and reading transducers by applying an enabling signal to the selected pair of transducers over a single line connected to both transducers.

FIGURE 2 illustrates the details of the selecting circuit and how it interconnects with the coils of the reading and writing transducers. In FIGURE 2, the reading transducers are again designated by the reference number 11 and the writing transducers are again designated by the reference number 13, but for purposes of simplification, only the coils of the transducers are actually illustrated. As shown in FIGURE 2, the reading and writing transducers which perform transducing operations in the same track are vertically aligned.

The end terminals of the coil of each reading transducer are connected through diodes 15 and 17 to busses 19 and 21, which are common to all of the reading transducers. The coils of the reading transducers are center-tapped and the diodes 15 and 17 are poled to permit current flow from the center tap to the common busses 19 and 21. When one of the reading transducers is selected, the voltage induced in the coil of the selected reading transducer will be transmitted to the busses 19 and 21 and will appear as a signal voltage between these two busses. The busses 19 and 21 transmit the signal voltage to a read amplifier 23, which accordingly will amplify the signal voltage induced in the coil of the selected reading transducer.

The end terminals of the coil of each writing transducer are connected through diodes 25 and 27 to busses 29 and 31 which are common to each writing transducer. Like the coils of the reading transducers, the coils of the writing transducers are center tapped and the diodes 25 and 27 are poled to permit current flow from the center taps to the busses 29 and 31. A write amplifier 33 is provided to generate recording signals between the busses 29 and 31. When a writing transducer is selected by the circuit of the present invention. current will flow through the coil of the selected transducer corresponding to the signal applied by the write amplifier between the busses 29 and 31 to record the signal in the selected track.

To make the selection of a pair of corresponding reading and writing transducers, a PNP transistor 35 is provided for each pair. The collector of each transistor 35 is connected to the center tap of the coil of the corresponding writing transducer, which center tap is connected through a resistor 37 to the center tap of the coil of the corresponding reading transistor. The collector of each transistor 35 is connected through a resistor 39 to a source of −15 volts applied to a terminal 41. The emitter of each transistor 35 is connected to ground. An input conductor 43 is connected to the base of each transistor 35. Four voltage dividers, each comprising a pair of series connected resistors 46 and 47 connected between a source of −15 volts applied to a terminal 55 and ground, are provided to apply biasing voltages of −11 volts to each of the four busses 19, 21, 29 and 31. The voltage dividers may conveniently form part of the read amplifier 23 and the write amplifier 33.

To select one pair of reading and writing transducers, a minus signal voltage is applied to the input lead 43 of the corresponding transistor 35. The negative signal voltage renders conductive the transistor 35, which clamps the center tap of the coil of the selected writing transducer at ground. Accordingly, current will flow from the center tap of the coil through both sides of the coil and through the diodes 25 and 27 to the busses 29 and 31 since a biasing voltage of −11 volts is applied to these busses. The diodes 25 and 27 connected to the unselected writing transducers will be back biased by the −15 volts applied at terminal 41. Because the diodes 25 and 27 connected to the coil of the selected writing transducer are forward biased, the signal applied by the write amplifier 33 between the busses 29 and 31 will be applied to the coil of the selected transducer and thus the signal voltage produced by the write amplifier 33 will be recorded in the selected track. The applied signal voltage actually operates to increase the current flowing through one side of the coil of the selected writing transducer and decrease the current flowing through the opposite side of the coil of the selected transducer to apply the signal to the selected transducer. If no signal is applied between the busses 29 and 31, no recording will be carried out by the selected transducer as the currents flowing through opposite sides of the selected transducer will be equal and in opposite directions so as to cancel each other out.

Ground potential applied to the center tap of the selected writing transducer will cause current to flow through the resistor 37 connected thereto to the center tap of the corresponding reading transducer and from the center tap through both sides of the coil and through the diodes 15 and 17 to the busses 19 and 21. As a result, the diodes 15 and 17 connected to the coil of the selected reading transducer will be forward biased and the signal voltage induced in the coil of the selected reading transducer by the recording in the selected track will be transmitted to the busses 19 and 21, which transmit it to the read amplifier 23. The signal voltages induced in the coils of the remaining reading transducers will not be transmitted to the busses 19 and 21 because the diodes 15 and 17 connected to the coils of these unselected transducers will be back biased by the −15 volts applied at terminal 41. In this manner, the selection of a corresponding pair of reading and writing transducers is made by applying an enabling signal voltage to a single input line.

With the system of the present invention, it is important to eliminate cross talk between the reading and writing heads. For this purpose, the center tap of the coil of each reading head is connected through the parallel circuit of a capacitor 57 and a diode 59 to a source of −11 volts applied at a terminal 61. Since the center tap of the coil of the selected writing transducer is clamped at ground, current will flow from the center tap of the coil of the selected writing transducer through the resistor 37 and through the diode 59 connected to the center tap of the selected reading transducer to the −11 volts applied at terminal 61 forward biasing this diode 59. As a result, the diode 59 will present a low resistance between the center tap of the selected reading transducer and the −11 volts applied at terminal 61. The low resistance of the forward biased diode 59 and the resistor 37 connected between the center taps of the coils of the selected reading and writing transducers will greatly attenuate any cross talk between the selected reading and writing transducers. The capacitors 57 also represent low impedances between the center taps of the coils of the reading transducers and the terminal 61 and the capacitors 57 together with the resistors 37 serve to greatly attenuate any cross talk between the unselected reading and writing transducers.

Thus there is provided a circuit for selecting a pair of reading and writing transducers by an enabling signal applied to a single input line yet eliminating the problem of cross talk between the selected pair of transducers.

The above description is of the preferred embodiment of the invention and many modifications may be made thereto without departing from the spirit and scope of the invention, which is defined in the appended claims.

What is claimed is:

1. A magnetic storage system comprising a first set of transducers operable to perform transducing operations in magnetic tracks, a second set of transducers operable to perform transducing operations in magnetic tracks, each of said transducers having a center tapped coil, a first pair of busses between which the coils of the transducers of said first set are connected, a second pair of busses between which the coils of the transducers of said second set are connected, rectifying means connected to each of said coils to permit current to flow only in one direction between said center taps and said busses, said transducers being organized in pairs with each pair of transducers consisting of a transducer from said first set and a transducer from said second set, a first set of impedance interconnecting the center taps of the coils of each of said pairs, selecting means operable to select any one of said pairs of transducers for transducing operations by applying to the impedance interconnecting the center taps of the coils of the selected pair a voltage to cause the rectifying means connected to the coils of the selected pair to conduct, and a second set of impedances low relative to said first set of impedances connected between the center taps of the coils of one transducer of each of said pairs and a source of reference potential.

2. A magnetic storage system as recited in claim 1 wherein said first set of transducers are writing transducers operable to record the signals applied between said first pair of busses in magnetic tracks and said second set of transducers are reading transducers operable to read out signals recorded in magnetic tracks and transmit them to said second pair of busses.

3. A magnetic storage system as recited in claim 2 wherein the transducers of any given pair are operable to perform transducing operations in the same magnetic tracks and wherein each pair of transducers is operable to perform transducing operations in a different tracks.

4. A magnetic storage system as recited in claim 1 wherein said first set of impedances are resistors.

5. A magnetic storage system as recited in claim 4 wherein said second set of resistances comprise parallel circuits of a rectifying diode and a capacitor.

6. A magnetic storage system as recited in claim 1 wherein said selecting means is operable to apply said voltage to the center tap of the coil of one transducer of each pair and said second set of impedances are connected between the center taps of the coils of the other transducers of each pair and said source of reference potential.

7. A magnetic storage system comprising a first transducer operable to perform transducing operations in a magnetic track, a second transducer operable to perform transducing operations in a magnetic track, each of said transducers having a center tapped coil, rectifying means connected to said coils to permit current flow in said coils only in one direction between said center taps and the end terminals of said coils, a first impedance interconnecting said center taps, means to selectively apply a voltage to said first impedance to cause said rectifying means to conduct thereby enabling said first and second transducers, and a second impedance low relative to said first impedance connected between one of said center taps and a source of reference potential.

8. A magnetic storage system as recited in claim 7 wherein said first and second transducers are operable to perform transducing operations in the same track and one of said transducers is operable to perform recording operations in said track and the other of said transducers is operable to read out signals magnetically recorded in said track.

9. A magnetic storage system as recited in claim 7 wherein said first impedance is a resistor.

10. A magnetic storage system as recited in claim 9 wherein said second impedance comprises a parallel circuit of a capacitor and a rectifying diode.

11. A magnetic storage system as recited in claim 7 wherein said means to apply a voltage to said first impedance applies said voltage to one of said center taps and said second impedance is connected between the other of said center taps and said source of reference potential.

References Cited

UNITED STATES PATENTS

| | | | |
|---|---|---|---|
| 2,927,304 | 3/1960 | Paquin | 340—174.1 |
| 2,926,298 | 2/1960 | Newhouse | 340—174.1 |
| 3,019,420 | 1/1962 | Reinholtz | 340—174.1 |
| 3,098,216 | 7/1963 | Samuel | 340—174.1 |

BERNARD KONICK, *Primary Examiner.*

VINCENT P. CANNEY, *Assistant Examiner.*